United States Patent [19]
Gerlach et al.

[11] Patent Number: 5,252,818
[45] Date of Patent: Oct. 12, 1993

[54] METHOD AND APPARATUS FOR IMPROVED SCANNER ACCURACY USING A LINEAR SENSOR ARRAY

[75] Inventors: Richard K. Gerlach, Rolling Hills Estates; James O. Bass, Torrance, both of Calif.

[73] Assignee: Vision Ten, Inc., Torrance, Calif.

[21] Appl. No.: 748,657

[22] Filed: Aug. 22, 1991

[51] Int. Cl.⁵ .................... H01J 40/14; H04N 3/14
[52] U.S. Cl. .................... 250/208.1; 358/213.15
[58] Field of Search .................... 250/208.1; 358/213.15–213.17, 461

[56] References Cited

U.S. PATENT DOCUMENTS

| | | | |
|---|---|---|---|
| 4,343,021 | 8/1982 | Frame | 358/213.28 |
| 4,543,610 | 9/1985 | Ozawa et al. | 358/213.15 |
| 4,698,685 | 10/1987 | Beaverson | 358/213.15 |
| 4,710,816 | 12/1987 | Yabumoto | 358/213.15 |
| 4,903,144 | 2/1990 | Stefanik et al. | 358/461 |
| 4,910,694 | 3/1990 | Walther | 358/213.17 |
| 5,025,318 | 6/1991 | Nagura | 358/213.15 |
| 5,038,225 | 8/1991 | Maeshima | 358/461 |
| 5,047,861 | 9/1991 | Houchin et al. | 358/213.15 |
| 5,086,343 | 2/1992 | Cook et al. | 358/213.15 |

*Primary Examiner*—David C. Nelms
*Assistant Examiner*—Michael Messinger
*Attorney, Agent, or Firm*—Blakeley, Sokoloff, Taylor & Zafman

[57] ABSTRACT

Improved linear sensor array and scanner apparatus and operating methods to reduce noise and streaking in a digitized image produced by the scanner. The scanner uses a charge coupled device linear sensor array having a pair of sensor output channels, each for processing one half of the array sensor elements which are interleaved with the other half of the sensor elements. To provide a reference, the CCD outputs are read a plurality of times with the system on but no article in scanning position, with the multiple readings for each sensor element being averaged to provide an average reference level therefor. These averages are stored in digital form, each to provide a calibration factor (multiplier) for the corresponding readings of the array during scanning of an article. During scanning, the output corresponding to each sensor element is multiplied by the corresponding calibration factor to normalize each output to a common reference. Thereafter, the outputs for the first and second sensor element locations are averaged, the outputs for the second and third sensor element locations are averaged, etc. across the entire line to provide the image scan line data, substantially eliminating any lack of tracking between the two output channels.

8 Claims, 1 Drawing Sheet

METHOD AND APPARATUS FOR IMPROVED SCANNER ACCURACY USING A LINEAR SENSOR ARRAY

BACKGROUND OF THE INVENTION

1. Field of the Invention

The present invention relates to the field of linear optical sensor arrays, particularly those using dual output channels servicing interleaved sensing elements, and scanners utilizing such arrays.

2. Prior Art

Scanners for scanning documents, x-rays and other images are now well known and widely used for various purposes, with the market therefor now being large and steadily increasing. One common type of scanner utilizes one or more linear arrays together with associated lighting and optics to view a single line of an article at a time, with the article being moved relative to the linear sensor array in a direction orthogonal to the length of the array at a uniform speed so that the image may be scanned line by line to provide two dimensional image data.

In such scanners there is normally a substantial variation in sensitivity exhibited by the output signals of the various sensor elements along the linear array, in part because of some variations in the array itself, but primarily due to variations caused by uneven lighting and particularly lensing which gathers more light from the center of the scan line than from the ends thereof. Thus, the apparent sensitivity across the array will generally be maximum at the center thereof and curve downward at each end thereof to some substantially reduced apparent sensitivity, typically with some asymmetry and roughness in the apparent sensitivity versus position on the array due to variations in the array, non-uniform lighting, dirt on mirrors and other components in the optical system, etc.

Thus, it is common to take a background reading of the sensors with the system (lighting, etc.) turned on but without an article in scanning position to measure these characteristics immediately before a scan. This measured background output for each sensor element is then stored and values computed so as to provide multipliers for each sensor element which, when used to multiply the output corresponding to that sensor element during scanning of an article, will normalize the apparent sensitivity across the linear array (or arrays), at least to the third order. Thus a uniform shade of grey across an article being scanned will ideally provide a uniform output across the array irrespective of the fact that the edge regions of the article being scanned are undoubtedly subjected to lower illumination than the center region and in spite of sensor element to sensor element sensitivity variations within the array, etc.

In practice, there are various sources of error which can vary from time to time and particularly scanner to scanner, thereby diminishing the performance a scanner user can be assured of obtaining upon the use of a scanner.

One source of error which may heretofore not have been recognized is noise in the reference readings used to normalize the apparent sensitivity of the sensor array along the length of a scan line. Aside from the fixed variations, the present inventors have found time variations in these apparent sensitivities. While one can imagine various causes for such short term variations, the net effect is that the typical method of taking the reference readings and normalizing the sensitivities across the array tends to lock in such variations as they existed at the time the reference readings were taken. Since errors in the reference readings will result in errors in the apparent sensitivity of the output of individual sensor elements, such errors will be replicated across entire lines of the image orthogonal to the array (e.g. in the direction perpendicular to the array scan line), resulting in streaking of the image, particularly apparent when part or all of the digitized image is displayed on a monitor. Image processing enhancements (e.g. sharpening filters) increase the appearance of streaks.

Another source of error which has been found by the inventors relates to the charge coupled display device (CCD) frequently used as the linear array in such scanners. One such sensor is the CCD 191 6000 element linear image sensor manufactured by Loral of Milpitas, Calif. Such devices have a row of image sensor elements with two transfer gates adjacent the sensor elements, one on each side thereof, which do a parallel transfer of interdigitated charge packets accumulated in the sensor elements to A and B transport (shift) registers, again one on each side of the row of sensor elements. These shift registers each shift the charge packets to a respective gated charge detector/amplifier, each of which provides an output signal from the linear detector circuit. Thus the outputs from the row of sensor elements appear alternately on the A and B channels, requiring the recombining (interleaving) of these signals into a single channel to provide the typical scan line data stream for storage and display.

Because of the two output channels, there is the possibility of the two channels being of different amplitude. In general, these may be trimmed so that, by way of example, the amplitude end points in the output range for the two channel correspond. However, because of potential non-linearities in the linear image sensor itself, in the external supporting electronics and/or caused by a combination of the two, there is an opportunity for such non-linearities to result in differences between the A outputs and the B outputs at various exactly equal illumination intensities within the normal operating range of the image sensor when in fact the outputs should be exactly equal. Further, because of the cost of such linear image sensors, it is not practical to use only linear image sensors selected from production which exhibit minimal or no detectable deviation between the two channels. The effect of such deviation is again to cause streaking in the digitized image in a direction orthogonal to the linear array, particularly for the grey shades of maximum difference between channels and when a portion of the digitized image is enlarged and displayed on an expanded scale. Further, it has been found that the transient response of the A and B channels is often unequal, which causes streaking in the portions of the image within which substantial changes in grey shade are occuring. Heretofore, to the best knowledge of the inventors, there has been no solution to this problem other than for manufacturers to work on product improvements to reduce the effect on future sensor arrays.

BRIEF SUMMARY OF THE INVENTION

Improved linear sensor array and scanner apparatus and operating methods to reduce noise and streaking in a digitized image produced by the scanner. The scanner uses a charge coupled device linear sensor array having a pair of sensor output channels, each for processing one half of the array sensor elements which are interleaved with the other half of the sensor elements. To provide a reference, the CCD outputs are read a plurality of times with the illumination system on but no article in scanning position, with the multiple readings for each sensor element being averaged to provide an average reference level therefor. These averages are stored in digital form, each to provide a calibration factor (multiplier) for the corresponding readings of the array during scanning of an article. During scanning, the output corresponding to each sensor element is multiplied by the corresponding calibration factor to normalize each output to a common reference. Thereafter, during the scanning operation, the outputs for the first and second sensor element locations are averaged, the outputs for the second and third sensor element locations are averaged, etc. across the entire line to provide the image scan line data. The averaging of multiple measurements for reference purposes substantially eliminates the noise in any one reference measurement, with the averaging of two adjacent sensor element outputs (which therefore come from different output channels of the sensor array) eliminating any lack of tracking of channel A with respect to channel B for all values of A and B and during fast transients between the two output channels without apparent loss of resolution, thereby providing a high quality digitized image characterized by low noise and a substantial absence of streaking.

BRIEF DESCRIPTION OF THE DRAWINGS

The FIGURE is a block diagram of the preferred embodiment of the present diagram.

DETAILED DESCRIPTION OF THE INVENTION

Figure 1:
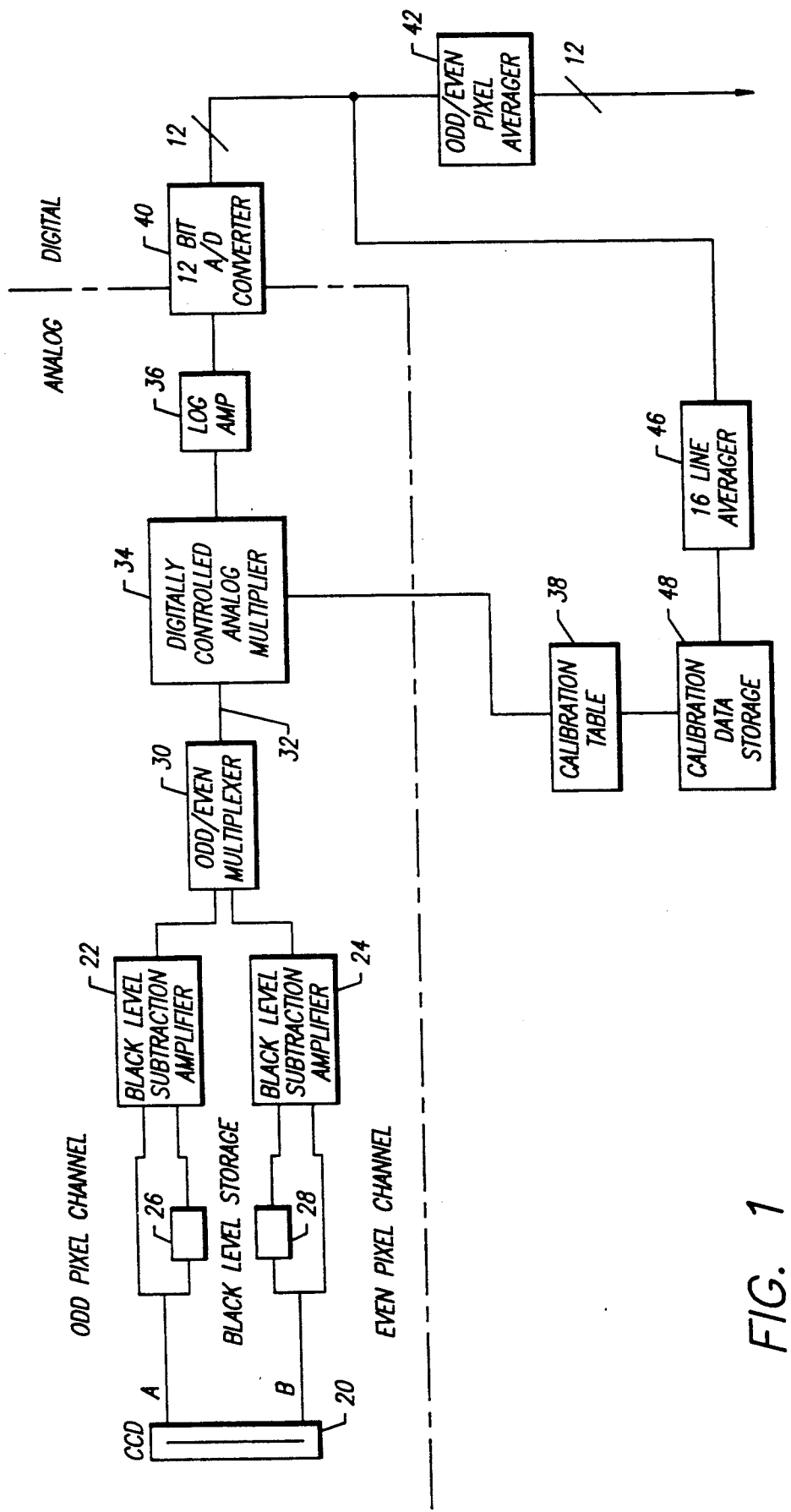

First referring to the FIGURE, a block diagram showing the system of the present invention may be seen. In the preferred embodiment, the charge coupled display device 20 is a Loral CCD191 6000 element linear image sensor. As previously described, this CCD device has A and B output channels serving interleaved sensor elements in the linear array. As may be seen in the FIGURE, the analog outputs for the A and B channels are coupled to black level subtraction circuits 22 and 24 respectively. The black level subtraction circuits combine the A and B analog outputs with corresponding A channel and B channel black level reference voltages from circuits 26 and 28 so as to substantially eliminate the effect of the difference in the offset voltage for the A and B channels of the CCD 20, and to set the DC level of the black level signals to be compatible with the rest of the signal processing circuitry.

Since the outputs of the sensor elements along the array alternate between the A channel and the B channel, the outputs of the black level subtraction circuits 22 and 24 are coupled through the A and B channel amplifiers to odd/even multiplexers 30 which combines the analog data stream of the A and B channels into a single sequential analog data stream on line 32.

The analog data stream on line 32 is amplified by the digitally controlled analog multiplier 34 and by a log amplifier 36 (which may be controllably bypassed if desired). The digitally controlled analog multiplier is controlled by calibration table 38 so as to cause the analog multiplier 34 to multiply each analog signal corresponding to a particular sensor output by a calibration factor for that sensor location, so as to ideally normalize the output of the digitally controlled analog multiplier for each sensor location output irrespective of the differences in sensor element sensitivities, illumination, etc. The calibration table 38 is operated as a READ ONLY lookup table containing a large plurality of digital multiplying factors, the table being addressed by the output of the calibration data storage 48. (A READ/WRITE lookup table which may be loaded under the program control may be used for this purpose if desired.) It is the manner of loading, and the data so loaded in the calibration system so that each sequential output of multiplexer 30 is multiplied by the appropriate normalizing factor which comprises one aspect of this invention, and which will be described in much more detail hereinafter.

The output of the log amplifier 36 (or in effect the output of the analog multiplier 34 if the log amplifier is not active) is provided to a 12 bit analog to digital converter 40 which converts each analog signal in the analog data stream to a corresponding 12 bit digital signal. This 12 bit digital signal is coupled to an odd/even pixel averager 42 (the function and operation of which will also be subsequently described in greater detail) with the 12 bit digital output of the averager 42 being interfaced to the balance of the imaging system.

As may be seen in the FIGURE, the output of the twelve bit analog to digital converter 40 is not only coupled to the odd/even pixel averager 42, but may also be coupled to the 16 line averager 46 which in turn may provide calibration data to the calibration date storage 48 for the calibration table 38.

In operation, before scanning an object or film, the system is calibrated by operating the scanner and associated electronics in the normal manner but without any item to be scanned, in scanning position. This provides a white level output for each sensor element as a twelve bit digital signal on the output of the converter 40. In general, the lighting and optical system of the scanner will normally provide greater light intensity at the center region of the CCD array than adjacent the ends, so that a plot of sensor output versus sensor position on the array will generally be highest for the middle sensor elements and sag downward significantly for the sensor elements adjacent the ends of the array. Superimposed on this general intensity profile however, are such things as the differences in the sensor element sensitivities, irregularities and non-symmetries in the lighting, etc., which effects, of course, also affect the white level outputs of the sensor elements along the sensor array. In the prior art, such a white level scan was used to determine calibration factors for each sensor location so as to multiply the output of each sensor location during the scanning of a document or other article by the computed normalization factor of the white level sensitivity of that sensor location so as to normalize the outputs of the sensor elements to a common white level sensitivity. In the present invention however, a substantial plurality of scans with no document in position for scanning is used to measure the white level sensitivity of each sensor element, with the average of such readings for each sensor being stored at the respective location in READ/WRITE calibration table 48. This has the effect of averaging any noise from any and all sources which may be on any particular sensor element output at any given time, providing, it has been found, a much better measure of the true white level sensitivity of the sensor elements independent of noise, transient or continuous, in the sensor element output and/or supporting electronics due to optical, electronic or other variations. Subsequently during scanning of a document, the calibration data storage 48 is read in unison with the clocking out of the sensor element outputs of the CCD 20. This addresses the calibration table 38 at the white level sensitivity of each respective sensor element output, with the calibration factor stored at the white level sensitivity address being an appropriate multiplying factor for that white level sensitivity to now normalize the grey shade output of the respective sensor element. In general the calibration factors stored in the calibration table 38 are inversely proportional to the address at which they are stored, so that the proper calibration factor for any sensor element is provided by addressing the calibration table 38 with the average white level output for the respective sensor element as read out of the calibration data storage 48.

In the preferred embodiment, sixteen such white level scans are made, with the sixteen white level outputs of each sensor being averaged by averager 46 to provide an average for that sensor element, so that the information stored in the calibration data storage 48 is the average of the sixteen lines. Of course, any lesser number or greater number of white level scans could be taken and averaged, though if 2n scans are taken and averaged, where n is an integer (8 in the preferred embodiment), then the average for any sensor location may be determined by adding 2n output signals for that location and then dropping the n least significant bits of the total to provide the average. In the preferred embodiment, 16 scans are used, as such scans may be taken very rapidly and it has been found that the noise in the white level output signals is well averaged by that number of scans, so that further averaging would not give meaningfully improved results. By way of further explanation for the above, if one adds two twelve bit numbers, one will obtain a thirteen bit number. Similarly, if one adds two thirteen bit numbers, one will obtain a fourteen bit number, etc. However, since both thirteen bit numbers might themselves be the sum of two twelve bit numbers, it therefore follows that adding four twelve bit numbers yields a fourteen bit number, adding eight twelve bit numbers yields a fifteen bit number, and adding sixteen twelve bit numbers yields a sixteen bit number. Thus, the twelve bit average of sixteen twelve bit numbers will be given by the twelve most significant bits of the resulting sixteen bit number.

The net result of this averaging is an improved accuracy in the white level sensitivity measurement for each sensor element, and thus improved accuracy in the calibration factors used in calibration table 38 as the multiplier for the respective sensor element during the scanning of a document. This is highly advantageous, as any error in this white level sensitivity measurement will result in a stored error in the calibration factor for each successive output of that sensor element during scanning of a document, resulting in streaking of the image data in a direction perpendicular to the length of the scanner array. Such streaking is particularly visible when a local area of the image is enlarged and/or a limited range of grey level is expanded to range from black to white.

Another aspect of the image enhancement of the present invention resides in the odd/even pixel averager 42, hereinbefore generally described as to function but not effect. The pixel averager averages the outputs of two adjacent sensor elements to provide an output to be used as if the same were a single sensor element output. By way of specific example, as each line is scanned, the pixel averager 42 will average the twelve bit digital signals for the first and second sensor locations, and will provide a twelve bit average for the same as the first output for that scan line. Similarly, the second and third signal presented thereto will be averaged to provide the second output for that scanned line, etc., whereby the image data for each scan line will be comprised of a sliding average for two sensor locations. Since any two successive signals presented to the pixel averager necessarily originate from different channels in the CCD, each output of the pixel averager represents the average of one signal taken from the A channel and one signal taken from the B channel. This in turn substantially eliminates the differences between the A and B channels, again substantially eliminating what can be another major source of streaking in the image data.

In terms of hardware, the pixel averager is simply an arithmetic logic unit (ALU) for adding an input latched therein through the A port to an input latched therein by the B port, both ports being coupled to the converter 40. In operation, the A and B ports are alternately enabled during successive outputs of the converter, so that the present output into one port is being added to the prior output of the converter that was latched into the ALU through the other port. The average, as previously described in principle, is taken as the upper 12 bits of the output by dropping (not connecting) the least significant bit of the output sum.

In particular, by careful measurement and subtraction of the black level output for each of channels A and B, black level outputs for the two channels may be made substantially equal. Similarly by repetitive scanning and averaging to determine the white level outputs, the white level outputs of the two channels may also be made substantially equal. However, the grey shades between the white level and black level outputs of the two channels may diverge slightly, as neither channel will be perfectly linear nor exactly track the other channel between black and white levels. In that regard, the extent of departure between the two channels will vary from CCD array to CCD array, and of course, will also be affected by the circuitry internal and external to the CCD, though in many cases will be sufficient to cause visible streaking in the resulting image. Similarly, it has also been found that the response of the two channels to a sharp grey shade transitions may differ substantially independent of the tracking of absolute grey shades per se, yielding different transient response characteristics also visible in the resulting image under certain conditions. The averaging of two adjacent data values through the sliding average hereinbefore described to provide the respective image data value effectively averages out the differences between channels, eliminating the streaking caused thereby with minimal reduction in resolution or black to white or white to black transient response.

Having described the details of the system of the present invention, the overall operation of the system may be described. Before placing a document in position for scanning, the system (lighting and electronics) is turned on and the CCD output signals A1, B2, A3, B4, . . . AN−1, BN (N=6000 in the preferred embodiment) are read a plurality of times (16 in the preferred embodiment). These multiple outputs for each sensor element in the array are averaged so as to be able to provide during the scanning of an article, corresponding sensor element reference signals A1r, B2r, A3r, B4r, ... A(N−1)r, BNr, each inversely proportional to the respective average. During the scanning of the article to provide image scan signals A1s, B2s, A3s, B4s, ... A(N−1)s, BNs for each line of the article scanned, the image scan signals A1s, B2s, A3s, B4s, ... A(N−1)s, BNs are each multiplied by the appropriate reference signal A1r, B2r, A3r, B4r, ... A(N−1)r, BNr to provide calibrated scan signals A1cs, B2cs, A3cs, B4cs, ... A(N−1)cs, BNcs, each proportional to a respective value of the products AnsAnr (n odd) and BnsBnr (n even), where n ranges from 1 to N. Finally, for each line output of the CCD during the scanning of an article, the outputs of each adjacent pair of sensor elements are combined with equal weighting in a sliding two sensor window fashion to provide a plurality of improved sensor outputs proportional to A1cs+B2cs, B2cs+A3cs, ... A(N−1)cs+BNcs, respectively, as the improved sensor output signals.

Thus there has been described herein an improved scanner apparatus and method of operating the same which will provide enhanced image quality and grossly reduced streaking from various potential error sources. While the preferred embodiment has been so described, it will be obvious to those skilled in the art that various changes in form and detail may be made in the invention without departing from the spirit and scope thereof.

We claim:

1. For use in a scanner having a scanner illumination system and a linear array of image sensor elements with a pair of sensor output channels A and B for processing the output of a first plurality of interleaved sensor elements 1 through N and having output signals A1, B2, A3, B4, ... AN−1, BN for each reading of the sensor elements, wherein the two sensor output channels may not track each other perfectly throughout the range of sensitivity of the linear image sensor, a method of providing improved sensor output signals during the scanning of an article comprising the steps of:

(a) turning on the scanner illumination system and reading each of the output signals A1, B2, A3, B4, ... AN−1, BN a second plurality of times without the article to be scanned in a scanning position;

(b) averaging the second plurality of each of a first plurality of signals A1, B2, A3, B4, ... AN−1, BN so as to be able to provide therefrom a first plurality of reference signals A1r, B2r, A3r, B4r, ... A(N−1)r, BNr each inversely proportional to the respective average;

(c) scanning the article to be scanned to provide a first plurality of image scan signals A1s, B2s, A3s, B4s, ... A(N−1)s, BNs for each line of the article scanned;

(d) for each of the first plurality of image scan signals A1s, B2s, A3s, B4s, ... A(N−1)s, BNs for each line of the article scanned, providing a first plurality of calibrated scan signals A1cs, B2cs, A3cs, B4cs, ... A(N−1)cs, BNcs, each proportional to a respective value of the products AnsAnr (n odd) or BnsBnr (n even), where n ranges from 1 to N; and (e) for each line output of the sensor, combining with substantially equal weighting the output of each adjacent pair of sensor elements to provide a plurality of improved sensor outputs proportional to A1cs+B2cs, B2cs+A3cs, ... A(N−1)cs+BNcs, respectively, as the improved sensor output signals.

2. The method of claim 1 wherein the output signals A1, B2, A3, B4, ... AN−1, BN and A1s, B2s, A3s, B4s, ... A(N−1)s, BNs of sensor output channels A and B are analog signals, the first plurality of reference signals A1r, B2r, A3r, B4r, ... A(N−1)r, BNr are stored in digital form during step (c) and wherein the digital reference signals are used to digitally control an analog multiplier to provide the products of step (d) in analog form.

3. The method of claim 1 wherein the products of step (d) are in analog form and further comprised of the step of converting the products of step (d) to digital form, and wherein step (e) comprises the step of adding the products in digital form and dropping the least significant bit to average the output of each adjacent pair of sensor elements to provide the plurality of improved sensor outputs proportional to A1cs+B2cs, B2cs+A3cs, ... A(N−1)cs+BNcs, respectively, as the improved sensor output signals.

4. A scanner comprising:

a linear array of image sensor elements with a pair of sensor output channels A and B for processing the output of a first plurality of interleaved sensor elements 1 through N and having output signals A1, B2, A3, B4, ... AN−1, BN for each reading of the sensor elements;

a scanner illumination system including means for turning on the illumination system and reading each of the output signals A1, B2, A3, B4, ... AN−1, BN a second plurality of times without an article to be scanned in a scanning position;

means for averaging the second plurality of each of a first plurality of signals A1, B2, A3, B4, ... AN−1, BN so as to be able to provide therefrom a first plurality of reference signals A1r, B2r, A3r, B4r, ... A(N−1)r, BNr each inversely proportional to the respective average;

means for scanning the article to be scanned to provide a first plurality of image scan signals A1s, B2s, A3s, B4s, ... A(N−1)s, BNs for each line of the article scanned;

means for providing a first plurality of calibrated scan signals A1cs, B2cs, A3cs, B4cs, ... A(N−1)cs, BNcs for each of the first plurality of image scan signals A1s, B2s, A3s, B4s, ... A(N−1)s, BNs for each line of the article scanned, each proportional to a respective value of the products AnsAnr (n odd) or BnsBnr (n even), where n ranges from 1 to N; and means for combining with substantially equal weighting the output of each adjacent pair of sensor elements for each line output of the sensor to provide a plurality of improved sensor outputs proportional to A1cs+B2cs, B2cs+A3cs, ... A(N−1)cs+BNcs, respectively.

5. In combination in a scanner:

a linear array of image sensor elements with a pair of sensor output channels A and B for processing the output of a first plurality of interleaved sensor elements 1 through N and having output signals A1, B2, A3, B4, ... AN−1, BN for each reading of the sensor elements;

a scanner illumination system including means for turning on the illumination system and reading each of the output signals A1, B2, A3, B4, ... AN−1, BN a second plurality of times without an article to be scanned in a scanning position;

means for averaging the second plurality of each of a first plurality of signals A1, B2, A3, B4, ... AN−1, BN so as to be able to provide therefrom a first plurality of reference signals A1r, B2r, A3r, B4r, ...

... A(N−1)r, BNr each inversely proportional to the respective average;

means for scanning the article to be scanned to provide a first plurality of image scan signals A1s, B2s, A3s, B4s, ... A(N−1)s, BNs for each line of the article scanned; and, means for providing a first plurality of calibrated scan signals A1cs, B2cs, A3cs, B4cs, ... A(N−1)cs, BNcs for each of the first plurality of image scan signals A1s, B2s, A3s, B4s, ... A(N−1)s, BNs for each line of the article scanned, each proportional to a respective value of the products AnsAnr (n odd) or BnsBnr (n even), where n ranges from 1 to N.

6. The method of claim 1 further comprising, following step (b), the step of averaging a third through sixteenth plurality of signals A1, B2, A3, B4, ... AN−1, BN with said first and second plurality of signals A1, B2, A3, B4, ... AN−1, BN so as to be able to provide therefrom said first plurality of reference signals A1r, B2r, A3r, B4r, ... A(N−1)r, BNr.

7. The scanner of claim 4 further comprising means for averaging a third through sixteenth plurality of signals A1, B2, A3, B4, ... AN−1, BN with said first and second plurality of signals A1, B2, A3, B4, ... AN−1, BN so as to be able to provide therefrom said first plurality of reference signals A1r, B2r, A3r, B4r, ... A(N−1)r, BNr.

8. The scanner of claim 5 further comprising means for averaging a third through sixteenth plurality of signals A1, B2, A3, B4, ... AN−1, BN with said first and second plurality of signals A1, B2, A3, B4, ... AN−1, BN so as to be able to provide therefrom said first plurality of reference signals A1r, B2r, A3r, B4r, ... A(N−1)r, BNr.

* * * * *